United States Patent
Kawano et al.

(10) Patent No.: US 7,225,352 B2
(45) Date of Patent: May 29, 2007

(54) METHOD OF TERMINATING A SCREEN SAVER AND RE-CREATING IMAGE DATA OF A DISPLAY MEMORY UPON POWER RESTORATION FROM AN IDLE STATE

(75) Inventors: Seiichi Kawano, Kanagawa-ken (JP); Toyoaki Inada, Sagamihara (JP); Norihito Ishida, Yokohama (JP); Yasumasa Takeda, Sagamihara (JP)

(73) Assignee: Lenovo (Singapore) Pte. Ltd, Singapore (SG)

( * ) Notice: Subject to any disclaimer, the term of this patent is extended or adjusted under 35 U.S.C. 154(b) by 388 days.

(21) Appl. No.: 10/792,587

(22) Filed: Mar. 3, 2004

(65) Prior Publication Data
US 2004/0225905 A1 Nov. 11, 2004

(30) Foreign Application Priority Data
Mar. 7, 2003 (JP) .............................. 2003-062385

(51) Int. Cl.
*G06F 1/00* (2006.01)
(52) U.S. Cl. ........................ 713/324; 713/300; 713/320
(58) Field of Classification Search ................ 713/324, 713/320, 300
See application file for complete search history.

(56) References Cited

FOREIGN PATENT DOCUMENTS

JP 2000-298536 10/2000

*Primary Examiner*—Chun Cao
*Assistant Examiner*—Malcolm Cribbs
(74) *Attorney, Agent, or Firm*—Kunzler & McKenzie; Carlos Munoz-Bustamante (57) ABSTRACT

An information processor includes a power-saver which switches a display memory to a power-saving state that causes image data to be lost and restores the display memory from the power-saving state. A storage area stores a predetermined activation condition and an activation routine mechanism activates a predetermined routine when the activation condition is satisfied. A routine termination mechanism ends the routine and an image data re-creation mechanism executes re-creation of the image data on the display memory when the routine is terminated. Provided are: an activation condition rewriting mechanism which rewrites the activation condition stored in the storage area so that the routine is activated when the display memory is switched to or restored from the power-saving state; and an activation condition restoration mechanism which restores the rewritten activation condition to the original condition after the routine is activated.

25 Claims, 9 Drawing Sheets

METHOD OF TERMINATING A SCREEN SAVER AND RE-CREATING IMAGE DATA OF A DISPLAY MEMORY UPON POWER RESTORATION FROM AN IDLE STATE

BACKGROUND OF THE INVENTION

The present invention relates a power-saving method utilizing a function of a program such as a screen saver, a power-saving program and an information processor to which they can be applied.

Since power consumed by a graphics chip in a personal computer has been increasing recently, there have been introduced techniques for suppressing power consumed by a VRAM, a graphics memory, by reducing the frequency of clocks to be supplied or by stopping power supply as a part of power management (see patent document 1, for example). Such power-saving techniques for a VRAM is traditionally used for switching to a power-saving mode via suspend or hibernation.

In the case of switching to a power-saving mode via suspend or hibernation, the display condition of a monitor must be restored to the original condition before the switching to the power-saving mode when the mode is restored from the power-saving mode to a normal mode. Accordingly, the context of the VRAM is generally stored before switching, and after restoration to the normal mode, the context is recovered to the original condition before switching to the power-saving mode, based on the stored context. However, when the OS itself supports power management, the OS performs initialization of and image data re-creation on the VRAM when the VRAM is restored to the normal mode, and therefore storage of the context of the VRAM and restoration thereof based on the stored data are not required. In the case where an OS does not support power management as Windows®[1] (registered trademark) NT 4.0, storage and recovery of the context of a VRAM are performed.

[1] The Windows mark is owned by the Microsoft Corporation.

On the contrary, in the case of an OS supporting power management such as Windows® (registered trademark) XP/2000/Me/98, there is provided a screen off timer function for powering off the monitor when a personal computer is left for a preset period of time. This function stops display of a LCD panel or an external CRT via an interface such as APM (Advanced Power Management), ACPI (Advanced Configuration and Power Interface) and DPMS (Display Power Management System) if there is no input from a keyboard or a mouse during a preset period of time, so that power consumption of the entire system can be saved.

(Patent Document 1)

Published Unexamined Patent Application No. 2000-298536

According to the prior-art techniques described above, however, when storing and recovering the context of a VRAM, area and time for storing the context is required. Especially when using a hibernation technique, it is necessary to store the context of a VRAM in a nonvolatile memory such as a hard disk. These days, the size of VRAM is increasing, and the data transfer rate for storage cannot be ignored. For example, in order to store the context of a VRAM with 64 MB in a hard disk, time of more than thirty seconds is required. Since the VRAM cannot be used during this time period, and the process progress condition cannot be displayed.

In a power-saving mode with a screen off timer, even when the monitor is powered off and display is unnecessary, supply of power or clocks to a VRAM is still continued.

A purpose of the present invention is to make a power-saving mode via suspend or hibernation available without necessity of storing contents of a VRAM and performing recovery based on the stored data even when an OS does not support power management, in consideration of the above problems of the prior-art technique. It is another purpose to enable supply of clocks or power to VRAM to be easily stopped without necessity of storing contents of a VRAM and performing recovery based on the stored data, when display on the monitor is unnecessary.

SUMMARY OF THE INVENTION

In order to achieve the purposes, an information processor according to the present invention is provided with: a memory for display for holding image data to be displayed by a display device; power-saving mechanism for switching the memory for display to a power-saving state that causes the image data to be lost and restoring the memory from the power-saving state; a storage area for storing a predetermined activation condition; routine activation mechanism for activating a predetermined routine when the activation condition is satisfied; routine termination mechanism for terminating the routine; and image data re-creation mechanism for executing re-creation of image data on the memory for display when the routine is terminated; the information processor including: activation condition rewriting mechanism for rewriting the activation condition stored in the storage area so that the routine is activated when the memory for display is switched to or restored from the power-saving state; and activation condition restoration mechanism for restoring the rewritten activation condition to the original condition after the routine is activated.

A power-saving method according to the present invention is to be implemented in an information processor provided with: routine activation mechanism for activating a predetermined routine when a stored, predetermined activation condition are satisfied; routine termination mechanism for terminating the routine; and image data re-creation mechanism for executing re-creation of image data on a memory for display holding image data to be displayed by a display device when the routine is terminated; the method comprising the steps of: switching the memory for display to a power-saving state that causes the image data to be lost; restoring the memory for display from the power-saving state; rewriting the stored activation condition so that the routine is activated when the memory for display is switched to or from the power-saving state; restoring the rewritten activation condition to the original condition after the routine is activated; and terminating the activated routine.

A power-saving program according to the present invention causes a computer to function as each of the means comprising an information processor according to the present invention, or causes a computer to execute each of the steps comprising a power-saving method according to the present invention.

In the configuration of the present invention, when switching a memory for display to a power saving state that causes image data to be lost and then restoring the memory from the state, it is necessary to restore contents of the memory for display to the original condition before the memory was switched to the power saving state. To cope with the necessity, in the present invention, a predetermined routine described above is used. This routine is necessarily accompanied by a process for causing image data re-creation to be performed on the memory for display to restore the memory for display to the original condition at the start of the routine, when the routine is terminated. Furthermore, the routine is activated when a stored, predetermined activation condition is satisfied, and it is terminated in response to generation of an input event and the like. According to the present invention, the routine is activated by rewriting the activation condition when the memory for display is switched to the power-saving state or restored therefrom; the routine is terminated when or after the memory for display is restored from the power-saving state; the activation condition is restored to the original condition; and thereby the image data re-creation process to be executed at termination of the routine is used to restore the memory for display.

When an OS does not support power management, image data re-creation on and initialization of the memory for display are not performed by the OS at the time of restoration from a power-saving state. Therefore, restoration of the memory for display is conventionally performed in a very time-consuming method in which all the contents of the memory for display are saved before the memory for display is switched to the power-saving state and restored to the original condition when it is restored from the power-saving state. If the present invention is applied to such cases, the memory for display is restored via image data re-creation performed at termination of the routine, and therefore, time required for switching to and restoration from the power-saving state is extremely shortened.

Traditionally, in some cases, even when a display device is switched to a power-saving state in which there is no need for the display device to receive image data sent from the memory display, no power-saving measures may be taken for the memory for display. If the present invention is applied to such cases, the memory for display is switched to the power-saving state, and it is restored from the power-saving state via image data re-creation accompanying termination of the routine. Thus, the memory for display can be easily switched to the power-saving state.

The memory for display (display memory) is generally such that is called a graphics memory or a video memory, and is a VRAM, for example. The power-saving state that causes image data to be lost is, for example, a state in which supply of power or control clocks to the memory for display is stopped. Image data re-creation on the memory for display means that each activated application program re-creates image data on the memory for display.

An activated routine can be terminated, for example, when a memory for display is restored from a power-saving state. In this case, the routine may be terminated by generating a pseudo input event for terminating an activated routine. Alternatively, the routine may be terminated in response to operation input from a keyboard or a mouse after the memory for display is restored from the power saving state.

Switching to or restoration from a power-saving state of a memory for display is performed, for example, by switching and restoring an information processor to and from a suspend or hibernation state. The memory for display may be switched to the power-saving state by stopping supply of clocks or power to the memory for display when a display device is in a predetermined power-saving state and therefore there is no need to send image data to the display device. As the predetermined power-saving state of the display device, D1 to D3 states in the ACPI specifications may be applied, for example.

Activation of the routine or image data re-creation on a memory for display may be performed, for example, by an OS installed in an information processor. A screen saver is used as the routine, and the activation condition can be stored in a registry to be referred to by the OS. A time condition specifying timing of activation can be used as the activation condition, for example. The time condition may be, for example, coming of a predetermined time, a lapse of a predetermined time duration or a lapse of a predetermined time duration in an idle state (no input state or no operation state).

If there is data of a hardware cursor in a memory for display in addition to image data, as in the case of Windows® (registered trademark) NT 4.0, it is necessary to initialize the portion at the same time the routine is terminated.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention.

Figure 1:
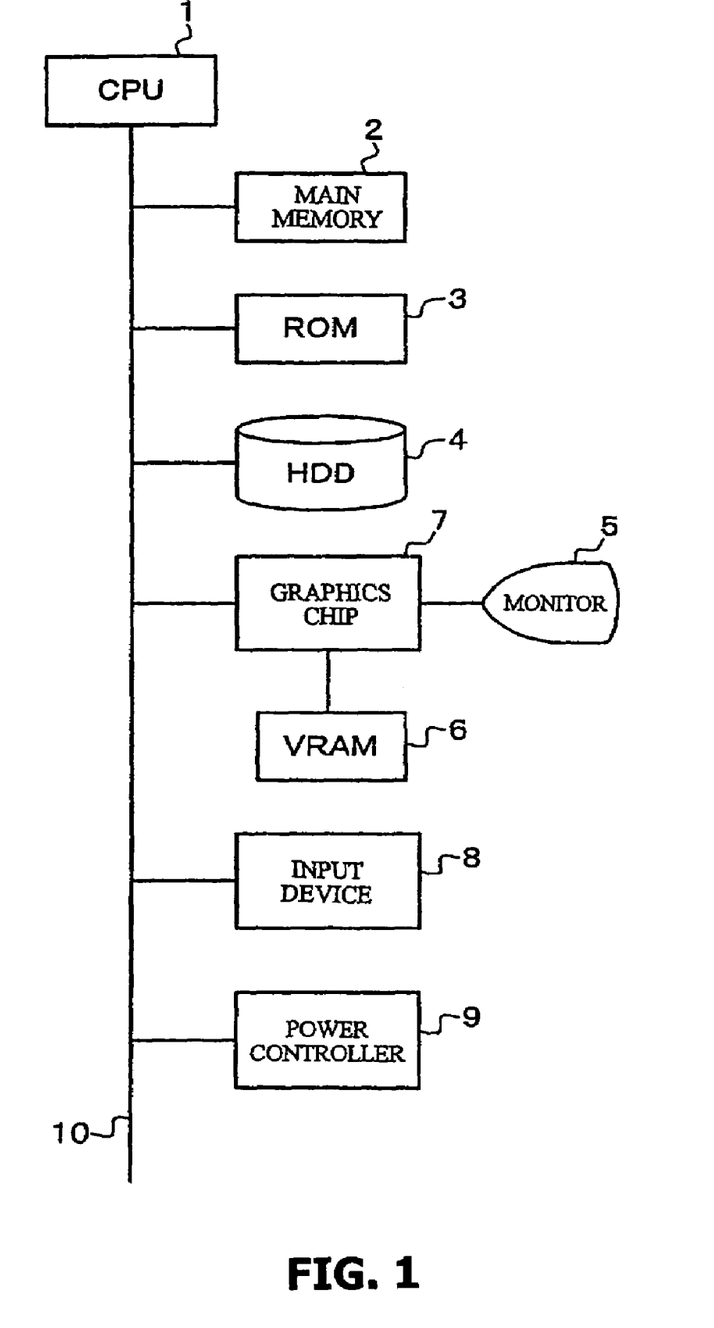
FIG. 1 is a block diagram showing a configuration of an information processor according to an embodiment of the present invention.

Referring now more particularly to the accompanying drawings, FIG. 1 shows a configuration of an information processor according to a first embodiment of the present invention. As shown in the figure, the information processor is provided with a CPU (central processing unit) 1 for interpreting and executing a program, a main memory 2 storing an activated program or data, a ROM 3 storing BIOS and the like, a hard disk 4 storing programs such as an OS (operating system) and data, a monitor 5 for performing display based on data from the CPU 1 and functioning as means for interfacing with a user, a VRAM (video RAM) 6 for holding image data to be displayed on the monitor 5, a graphics chip 7 for controlling data transfer from the CPU 1 to the VRAM 6 and display on the monitor 5 based on contents of the VRAM 6, an input device 8 such as a mouse and a keyboard, and a power controller 9 for controlling power supply to each portion of the information processor. The portions are connected to one another via a bus 10. The graphics chip 7 also has a function of controlling clock supply and power supply to the VRAM 6.

The BIOS in the ROM 3 has a power management function, and also has an interface for power management by the OS. An example of the BIOS is such that is called an APM (Advanced Power Management) BIOS. Such an OS that itself does not support power management, such as Windows® (registered trademark) NT 4.0, is used as the OS.

When the OS does not support power management, restoration of contents of the VRAM, which is required when the information processor is switched to and then restored from a suspend or hibernation state (hereinafter referred simply to a suspend state), is not performed by the OS.

However, an OS has a program called a screen saver. The screen saver is activated when an idle state has continued for the idle time before activation, the idle time being stored in a registry. The idle state means a state in which there is no operation input from the input device 8, for example. This may be defined in consideration of whether or not there is access to the hard disk 4. After the screen saver is activated, it stops activity when the idle state is released by operation input and the like. The OS directs the activated application to re-creation image data on the VRAM 6 to restore the contents displayed on the monitor to the original condition before activation of the screen saver then.

Figure 2:
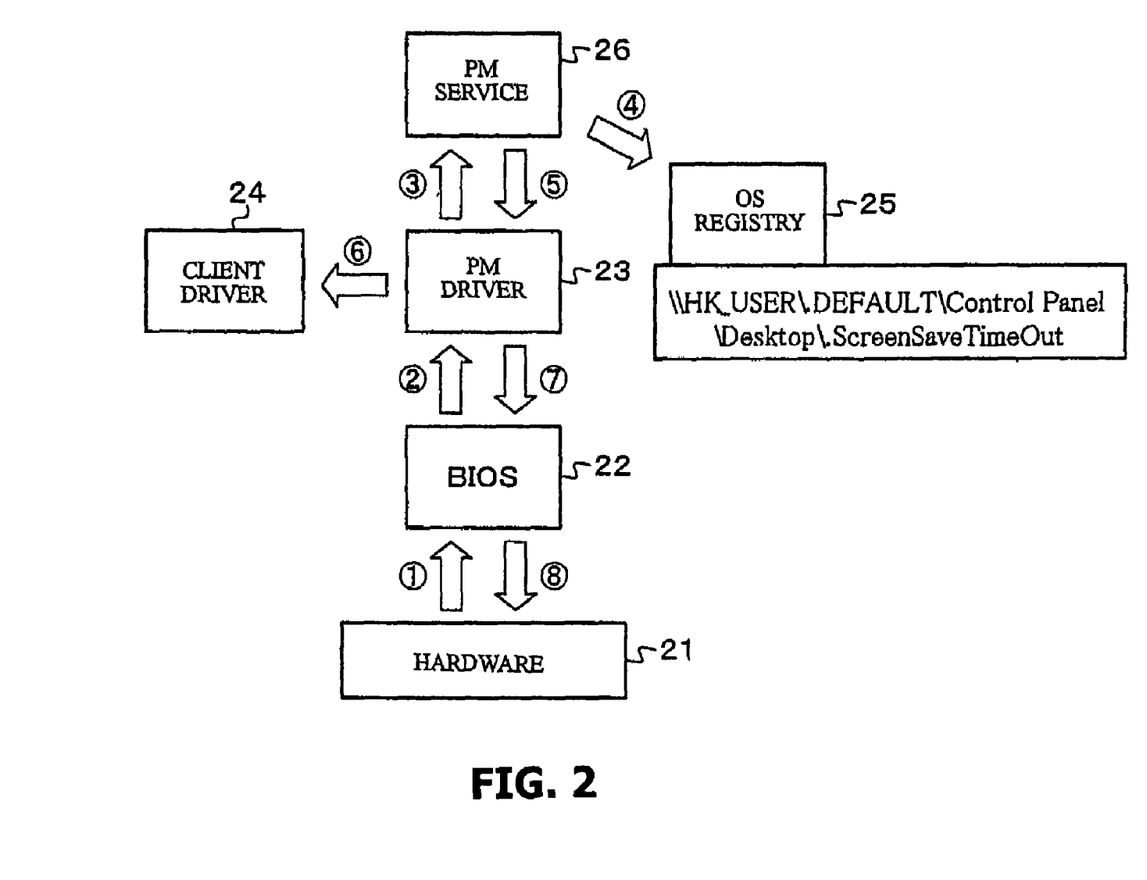
FIG. 2 is a block diagram showing a power management system in the information processor in FIG. 1.

FIG. 2 shows a power management system in the information processor in FIG. 1. As shown in the figure, the system is provided with a BIOS 22 for functioning as a software interface for hardware 21, a PM driver 23 connected to the BIOS 22, for controlling power management, a client driver 24 for providing a software interface for performing power management for hardware added by a user, and a PM service 26 for rewriting a registry 25 of the OS based on a direction from the PM driver 23. The hardware 21 includes an input device 8 suitable for power management.

The BIOS 22 controls the power management function for hardware on the motherboard. The client driver 24 supports the power management function for devices which are not on the motherboard as software. Devices which are not on the motherboard include an add-in card or a PC card, for example.

The part of the registry to be rewritten by the PM service 26 is a part for setting an idle time before activation of a screen saver. A user can set a screen saver to be activated when there has been no input from a keyboard or a mouse for a set, predetermined time period, while the PM service 26 rewrites the set time period.

Figure 3:
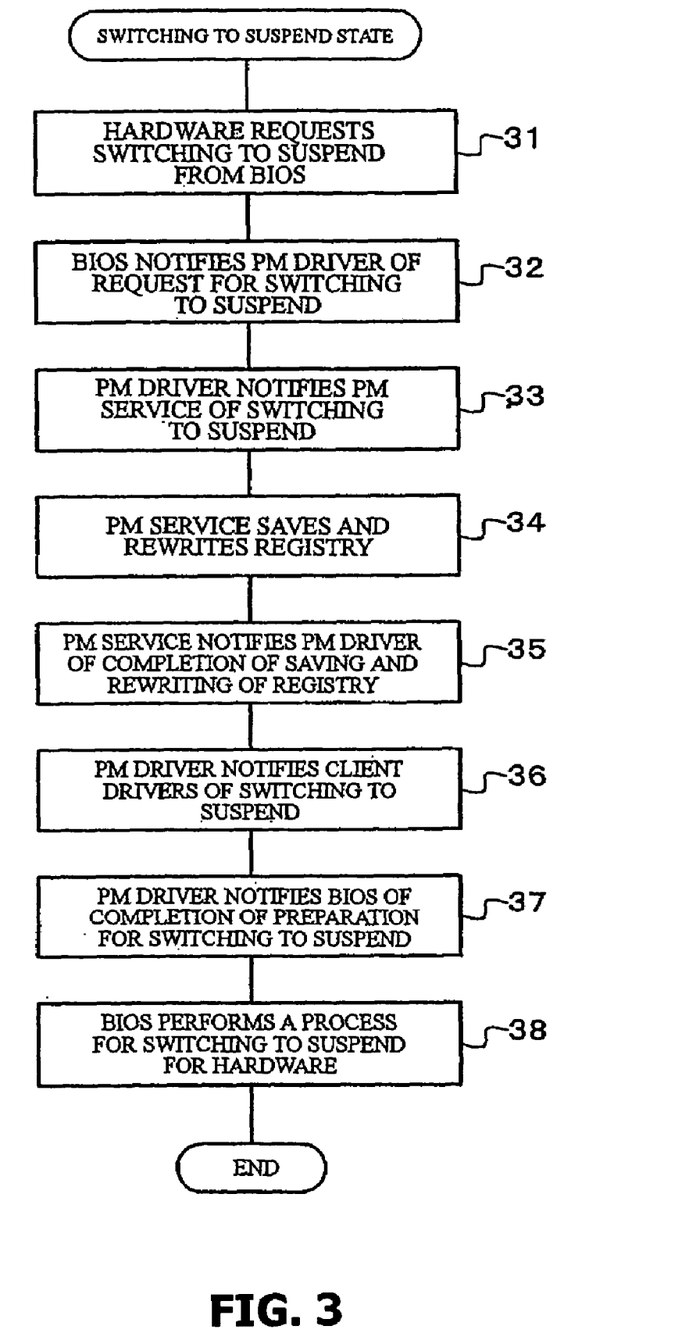
FIG. 3 is a flowchart showing a process for switching to a suspend state in the power management system in FIG. 2.

FIG. 3 shows a process for switching to a suspend state in the power management system in FIG. 2. Steps 31 to 38 in FIG. 3 correspond to ① to ⑧ of an information flow shown in FIG. 2. When a request for switching to a suspend state is made by the hardware 21 (step 31), the BIOS 22 notifies the PM driver 23 of the request (step 32). The request for switching to a suspend state by the hardware 21 may be generated, for example, by interruption based on pressing down of a suspend button, reduction in the remaining battery capacity, closing of a cover and the like. The request may be a request by a program based on a direction input by a user.

When receiving the notification of a request for switching to a suspend state, the PM driver 23 notifies each client of switching to a suspend state. This is notified to the PM service 26 first (step 33). Receiving this notification, the PM service 26 saves the value set as an idle time before activation of a screen saver, the value being set in the registry 25, and instead sets one second, which is a settable minimum unit (step 34). This value set as the idle time is referred to by the OS to activate the screen saver if an application or a device has been in an idle state for the set time, and therefore the screen saver is activated after one second.

When the set value has been saved and rewritten, the PM service 26 notifies the PM driver 23 to that effect (step 35). When receiving the notification, the PM driver 23 notifies other clients 24 of switching to a suspend state (step 36). When receiving this notification, each of the client drivers 24 takes suitable measures such as saving of information which is required when each corresponding device is restored from the suspend state.

When each client has been notified of switching to the suspend state, the PM driver 23 notifies the BIOS 22 that each of the clients 24, 26 on the OS has prepared for switching to the suspend state (step 37). When receiving this notification, the BIOS 22 disables all the input devices such as a PS/2 keyboard, a PS/2 mouse, a USB device and the like and accesses hardware required for suspend to switch the system to the suspend state after one second (step 38). Since one second, a set idle time after rewriting above, has already elapsed, the screen saver has been activated.

Figure 4:
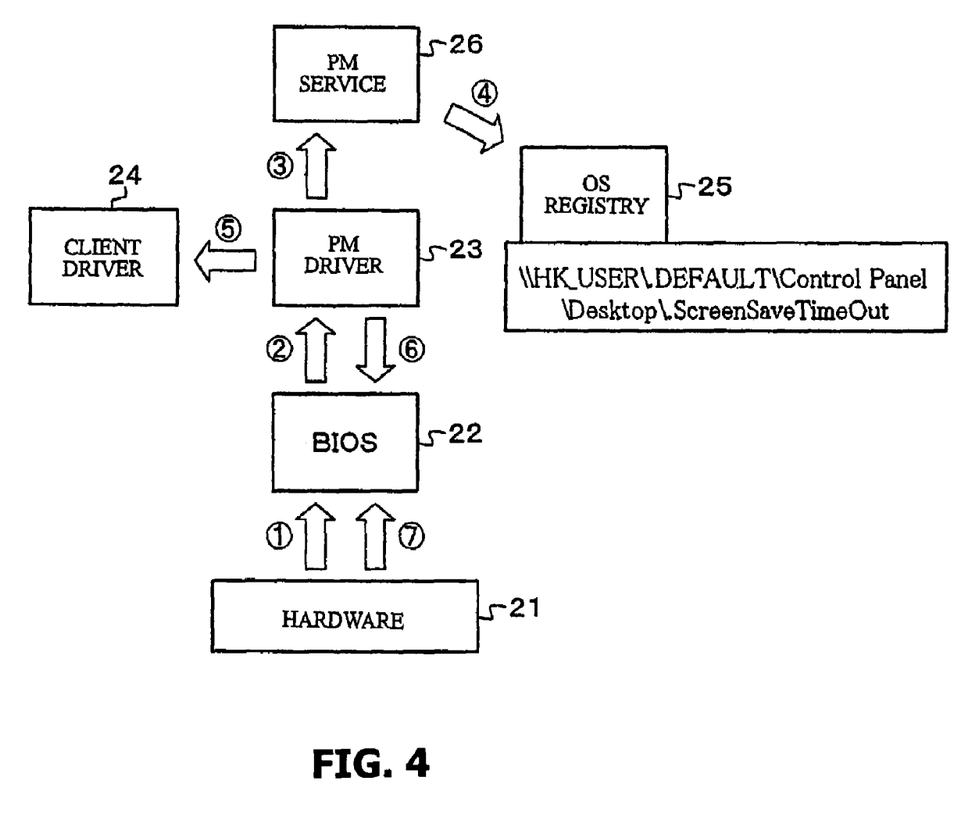
FIG. 4 is a block diagram showing an information flow in the power management system in FIG. 2, which is caused at the time of restoration from a suspend state.
Figure 5:
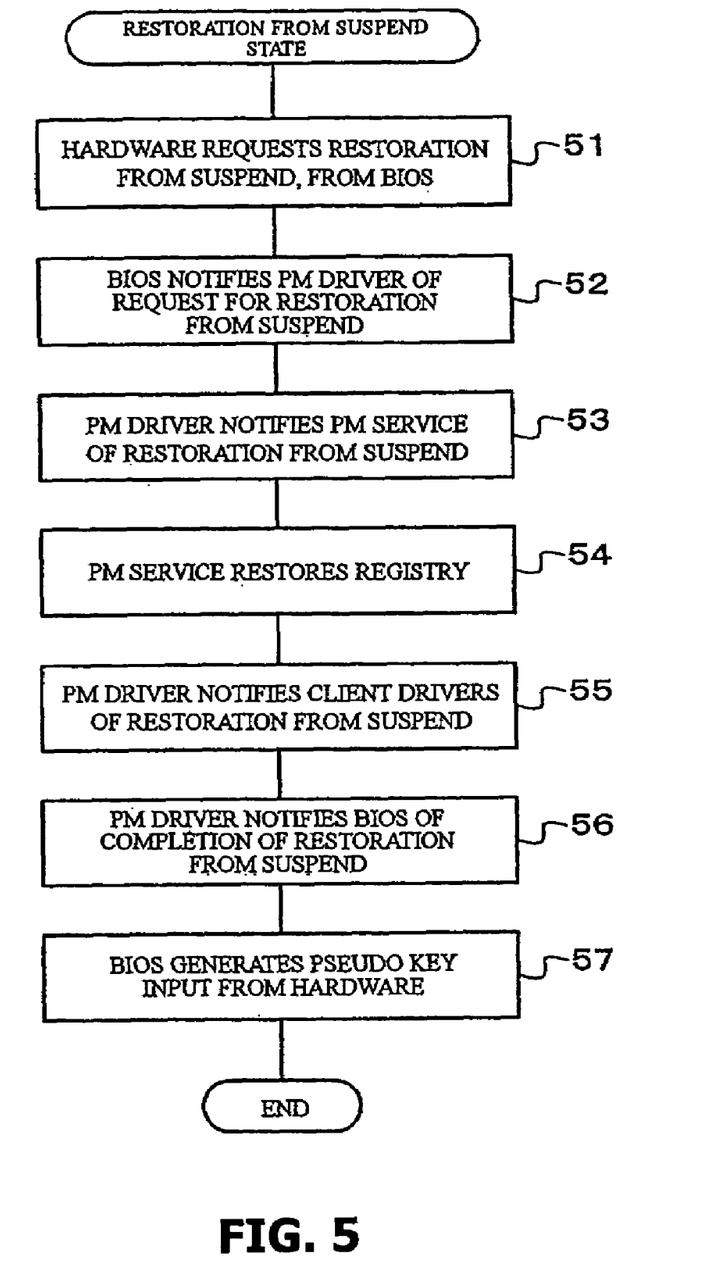
FIG. 5 is a flowchart showing a process performed by the power management system in FIG. 2 at the time of restoration from a suspend state.

FIG. 4 shows an information flow caused at the time of restoration from a suspend state. FIG. 5 shows a process performed at the time of restoration from the suspend state. The processings performed at steps 51 to 57 in FIG. 5 correspond to ① to ⑦ of the information flow shown in FIG. 4. When necessary power supply and the like are resumed based on an operation of a power source button or an input device, an operation of a modem or a timer and the like, and the BIOS 22 recognizes that a request for restoration from the suspend state is made (step 51), the BIOS 22 notifies the PM driver 23 of the request for restoration from the suspend state (step 52).

When receiving this restoration request notification, the PM driver 23 notifies each client of restoration from the suspend state. The PM driver 23 first notifies the PM service 26 of restoration from the suspend state (step 53). When receiving this notification, the PM service 26 replaces the idle time before activation of a screen saver, which is set in the registry, with the set value, which has been saved, to return the value to the original set value before switching to the suspend state (step 54). The PM driver 23 then also notifies other clients of restoration from the suspend state (step 55). When receiving this notification, each client driver 24 restores each corresponding device to the original condition before switching to the suspend state, based on the saved information.

When having notified each client of restoration from the suspend state, the PM driver 23 then notifies the BIOS 22 that each client on the OS has restored from the suspend state (step 56). When receiving this notification, the BIOS 22 generates a pseudo event of a key input from hardware (step 57). Based on the key input event, the OS terminates activity of the screen saver. In doing so, the OS directs each of activated applications to perform image data re-creation on the VRAM, based on its original function of restoring the original display condition before activation of the screen saver. This causes the contents of VRAM, which have been destroyed during the suspend state, to be recovered, and the display condition of the monitor is restored to the original condition before switching to the suspend state. When the OS is Windows® (registered trademark) NT 4.0, there is data of a hardware cursor in the VRAM, in addition to image data, so that it is also necessary to initialize the portion via a video driver.

According to this embodiment, contents of a VRAM are restored to the original condition before switching to a suspend state, utilizing an image data re-creation function used at termination of a screen saver, so that time required for switching to or restoration from the suspend state is shortened in comparison with the prior-aft techniques in which contents of a VRAM are saved before switching to a suspend state and are restored from the suspend state based on the data which has been saved.

Figure 6:
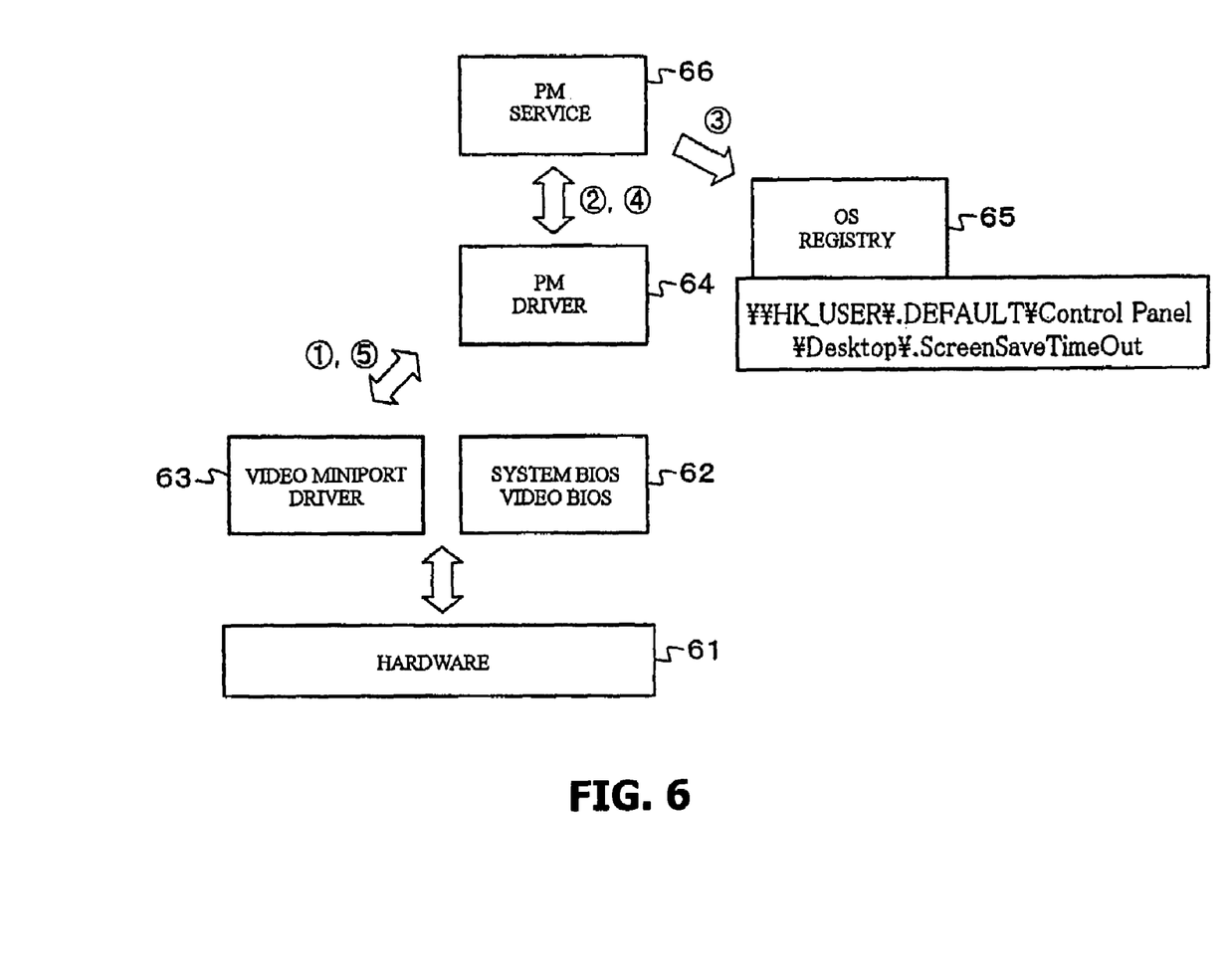
FIG. 6 is a block diagram showing a power management system according to another embodiment of the present invention.

FIG. 6 shows a power management system according to another embodiment of the present invention. Though hardware configuration in FIG. 1 can be also applied to this system, Windows® (registered trademark) 2000 or Windows® (registered trademark) XP is used as the OS. As shown in FIG. 6, this system is provided with a BIOS 62 for providing an interface for hardware 61, a video miniport driver 63 for programming a monitor into a power-saving mode, a PM driver 64 for controlling power management, and a PM service 66 for rewriting and restoring a registry 65 of the OS based on a notification from the PM driver 64.

Figure 7:
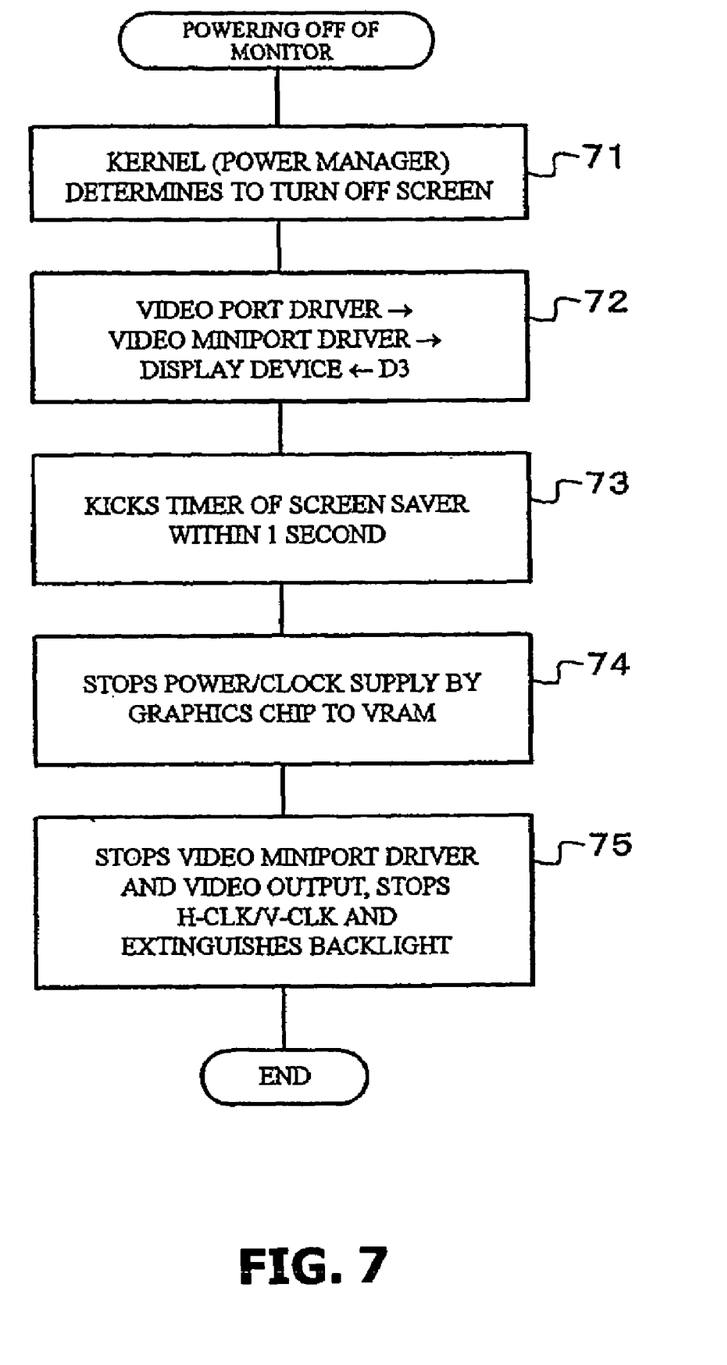
FIG. 7 is a flowchart showing a process for powering off the monitor, which is performed by the power management system in FIG. 6.

FIG. 7 shows a process for powering off the monitor in the power management system in FIG. 6. When a power manager of a kernel, which manages presence/absence of an input by a user and a timer associated with it, determines to power off the monitor based on the fact that there has been no input by a user during an idle time before powering off of the monitor, the idle time having been set by the user (step 71), the determination is notified to a video port driver. Finally, a video miniport driver, a video BIOS called by the driver, or an ACPI BIOS controlling hardware of a planar, suitable for the graphics chip, is called (step 72), and the monitor is programmed into a power-saving mode (step 75). The screen saver is activated, according to the present invention, before programming the monitor into the power-saving mode (step 73), and the video miniport driver stops clock supply or power supply to a VRAM by the graphics chip (step 74) to switch the VRAM to a power-saving state. In the processing at step 73, similarly to the embodiment shown in FIGS. 2 and 3 described above, the idle time before activation of a screen saver, the idle time being set in the registry 65, is saved by the PM service 66 via the PM driver 64 and replaced with a value less than one second so that the screen saver can be activated within one second. Reference numerals ① to ⑤ in FIG. 6 show an information flow generated then.

At step 75, the video miniport driver 63 stops video output by the graphics chip to the monitor. Furthermore, sending of horizontal synchronization signals and vertical synchronization signals are stopped, or backlight is turned off. These cause the monitor to be turned off.

Figure 8:
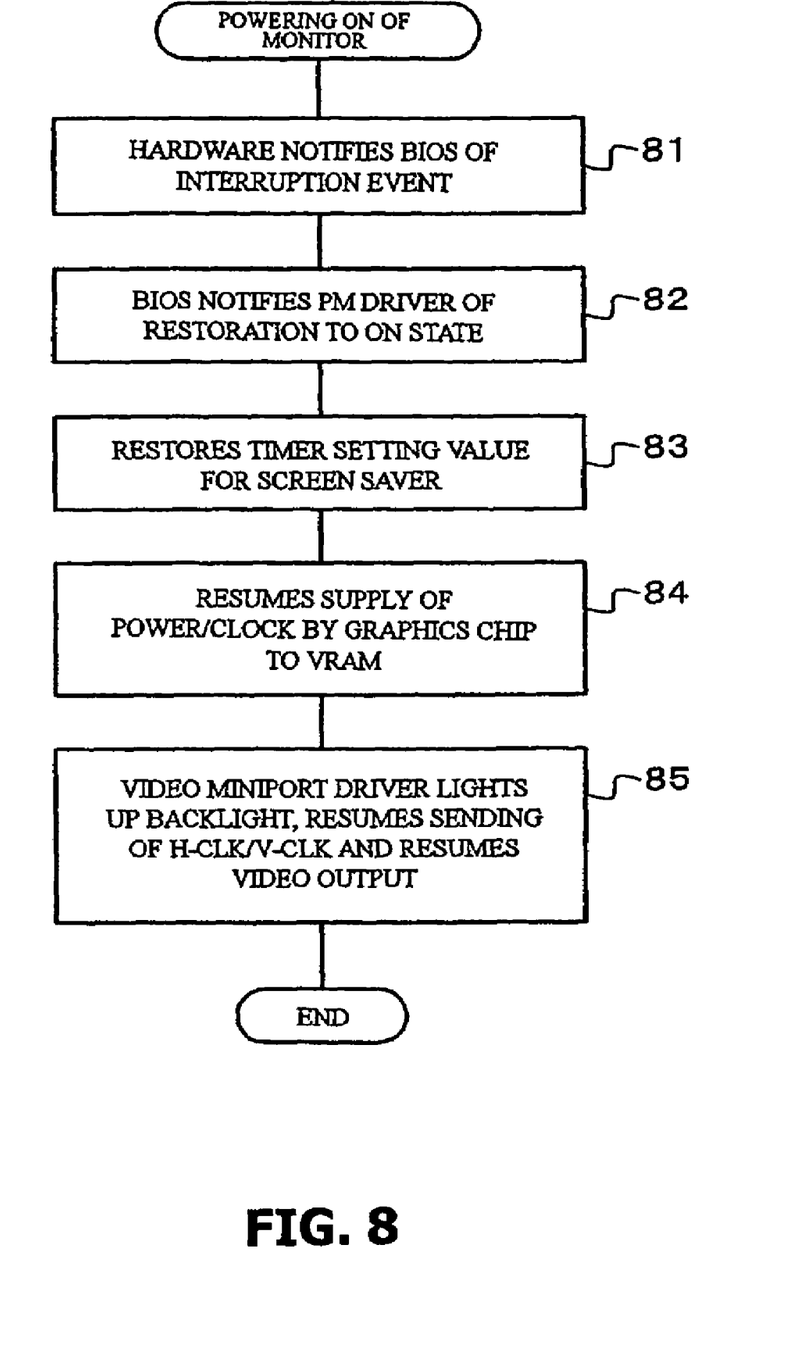
FIG. 8 is a flowchart showing a process for restoring the monitor to an on state, which is performed by the power management system in FIG. 6.
Figure 9:
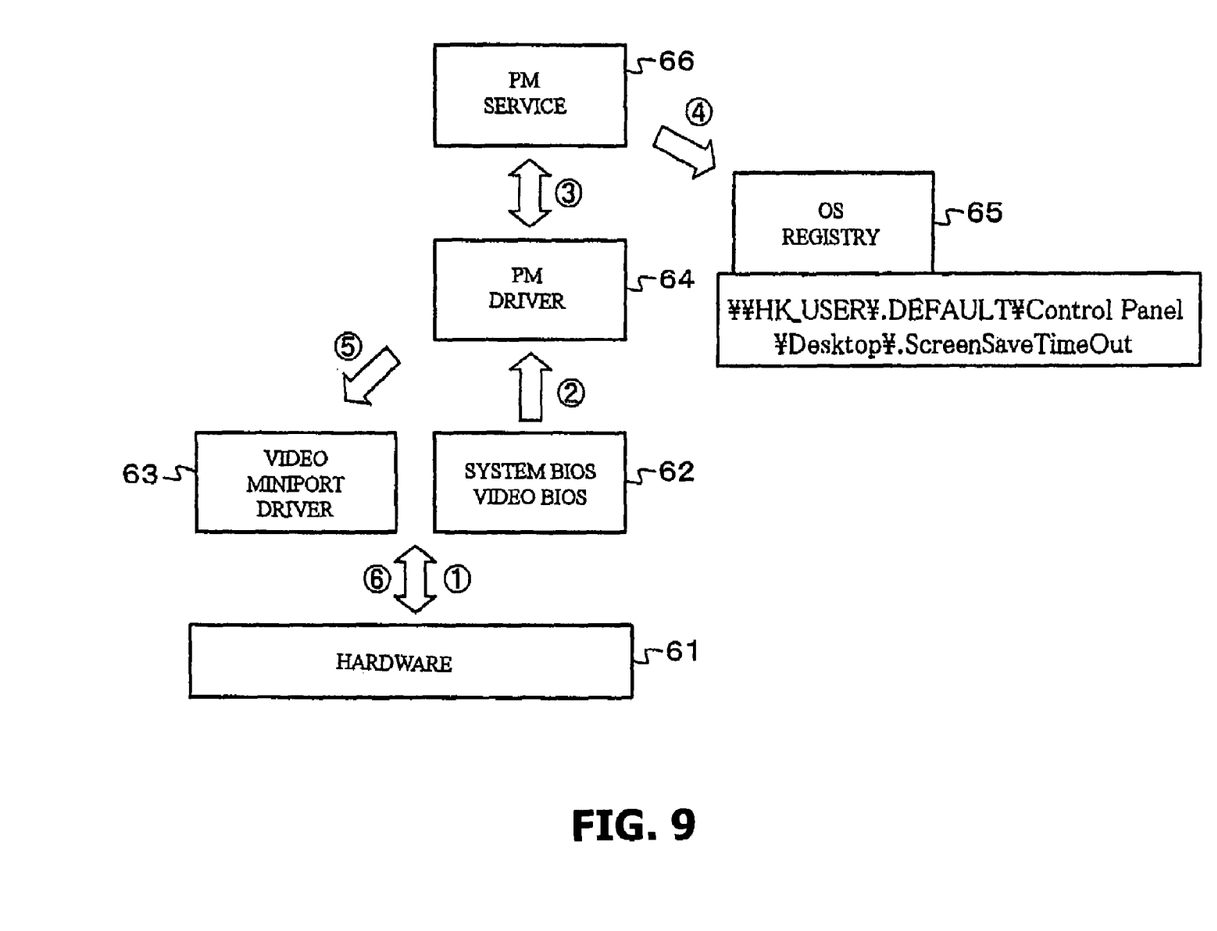
FIG. 9 is a block diagram showing an information flow in the process in FIG. 8.

FIG. 8 shows a process for restoring the monitor to an on state after it is switched to an off state (D3 state specified in the ACPI specifications) as described above. Reference numerals ① to ⑥ in FIG. 9 shows an information flow generated then. When an interruption is caused by an operation of a keyboard or a mouse, it is notified to the system BIOS 62 (step 81). Activity of the screen saver is not terminated, since the control has not been returned to the OS at this point of time.

Receiving the interruption notification, the system BIOS 62 notifies the PM driver 64 that the monitor is restored to the on state (step 82). The PM driver 64 notifies this to the PM service 66 and the video miniport driver 63. Receiving this notification, the PM service 66 replaces the idle time before activation of a screen saver, which is set in the registry, with the value which has been saved (step 83).

The video miniport driver 63, having received the notification of restoration to the on state, starts clock supply or power supply to the VRAM by the graphics chip. This causes the VRAM to be restored from the power-saving state. Furthermore, the video miniport driver 63 starts video output to the monitor and sending of horizontal synchronization signals and vertical synchronization signals, which have been stopped, and lights up the backlight which has been off (step 85). This causes the monitor to be restored to the on state.

Then, when the user operates an input device, the screen saver stops, image data re-creation is performed on the VRAM, and the image displayed when the monitor was switched to the off state is displayed on the monitor again.

According to this embodiment, contents of a VRAM are restored to the original condition before switching to a power-saving state by utilizing an image data re-creation function performed when the screen saver is terminated, so that supply of clocks or power to the VRAM can be easily stopped when the monitor is turned off, which realizes power-saving.

The present invention is not limited to the embodiment described above and can be implemented in an appropriately modified embodiment. For example, though a screen saver is activated at the time of switching to a power-saving state in the above description, the screen saver may be activated at the time of restoration from the power-saving state, instead. This method, however, is not desirable in the case where the OS saves data, which has been stored in the VRAM, into the main memory when the screen saver is activated, because the saved data may be lost during restoration from the power-saving state. Furthermore, when the screen saver is activated at the time of restoration from the power-saving state, a screen with undefined contents may be displayed for some time until the screen saver is activated.

As described above, according to the present invention, a routine, which is activated when a stored activation condition is satisfied and which performs image data re-creation on a memory for display when it terminates its activity so that the routine is activated and the activation condition is restored to the original condition by rewriting the activation condition at the time of switching to or restoration from a power-saving state. Thus, it is possible to switch or restore the memory for display to or from such a power-saving state that causes contents of the memory for display to be destroyed, without necessity of saving and returning again the contents of the memory for display.

Accordingly, even when image data re-creation on the memory for display is not performed by an OS at the time of switching to or restoration from a power saving state that causes contents of a memory for display to be destroyed, such as a suspend or a hibernation state, because the OS itself does not support power saving, switching to or restoration from such a power-saving state can be easily performed. Furthermore, when a display device is switched to a power-saving mode such as an off state, clock or power supply to the memory for display can be easily stopped, which can further improve power-saving.

In the drawings and specifications there has been set forth a preferred embodiment of the invention and, although specific terms are used, the description thus given uses terminology in a generic and descriptive sense only and not for purposes of limitation.

We claim as our invention:

1. Apparatus comprising:
    a display memory which holds image data which is to be displayed on a provided display device;
    a power controller which is coupled to said display memory and which switches said display memory to a power-saving state that causes the image data to be lost and restores said display memory from the power-saving state;
    a storage area which stores a predetermined idle time activation condition;
    a memory; and
    a processor which is operatively coupled to said power controller, said storage area, and to said memory and which executes code stored in said memory, the code including:
        activation condition rewriting code which is effective to rewrite the idle time activation condition configured as a stored in the storage area to an idle time minimum unit in response to a request for the power-saving state so that the idle time activation condition is satisfied:
        routine activation code which is effective to activate a screen saver routine when the idle time activation condition is satisfied;
        activation condition restoration code which is effective to restore the rewritten idle time activation condition to the original predetermined idle time activation condition after the screen saver routine is activated; and
        routine termination code which is effective to terminate the screen saver routine in response to a request for restoration from the power-saving state;
        image data re-creation code which is effective to execute the re-creation of image data on the display memory when the routine is terminated.

2. Apparatus of claim 1 wherein the routine termination code terminates the activated screen saver routine when said display memory is restored from the power-saving state.

3. Apparatus of claim 1 wherein the routine termination code terminates the activated screen saver routine in response to operational input after said display memory is restored from the power-saving state.

4. Apparatus of claim 1 wherein said power controller switches said processor to a state selected from a suspend state and a hibernation state and restores said processor from the state.

5. Apparatus of claim 1 wherein said power controller switches said display memory to the power-saving state by stopping a resource to said display memory when the display device is in a predetermined power-saving state and there is no need to send image data to the display device, wherein the resource is a supply of clocks or power.

6. Apparatus of claim 1, wherein: the routine activation code and image data re-creation code are operating system (OS) installed; and the storage area is a registry which is referred to by the OS.

7. Apparatus of claim 2 wherein the routine termination code includes code which generates a pseudo input event which terminates the activated routine.

8. Apparatus of claim 1 wherein said processor executes code which is further effective to initialize the data portion of a hardware cursor in said display memory when the routine is terminated.

9. Apparatus comprising:
    a CPU and a main memory, wherein the CPU executes code stored in the main memory under the control of a predetermined operating system (OS);
    a VRAM which consumes power when clocked;
    a graphics chip which is operatively coupled to said CPU and to said VRAM and which stops a resource to said VRAM and switches said VRAM to a power-saving state, wherein the resource is selected from a supply of clocks and a supply of power;
    a registry which is operatively coupled to said CPU and which is maintained on an auxiliary storage device and onto which an idle time is stored after the OS activates a screen saver, the screen saver being stopped in response to operational input;
    wherein the code executed by said CPU is effective to:
        rewrite the idle time in said registry to an idle time minimum unit in response to a request for the power-saving state so that the screen saver is activated as said VRAM is switched to the power-saving state;
        restore the idle time to the original time;
        restore the VRAM from the power-saving state in response to a request for restoration from the power-saving state;
        terminate the screen saver routine in response to the request for restoration from the power-saving state; and
        restore the VRAM context.

10. A method comprising:
    switching, in a system which activates a predetermined screen saver routine when a stored and predetermined idle time activation condition is satisfied and executes re-creation of image data on a display memory which holds image data to be displayed by a provided display device when the screen saver routine is terminated, the display memory to a power-saving state that causes the image data to be lost;
    rewriting the stored idle time activation condition to an idle time minimum unit in response to a request for the power-saving state so that the screen saver routine is activated as the display memory undergoes a power-saving state transition;
    restoring the rewritten idle time activation condition to the original predetermined activation condition after the screen saver routine is activated;
    restoring the display memory from the power-saving state; and
    terminating the activated screen saver routine in response to a request for restoration from the power-saving state.

11. The method of claim 10 wherein the screen saver routine is terminated when the display memory is restored from the power-saving state.

12. The method of claim 10 wherein the screen saver routine is terminated in response to operational input after the display memory is restored from the power-saving state.

13. The method of claim 10 wherein the display memory is switched to and restored from the power-saving state in response to the system being switched to and restored from a state wherein the state is selected from a suspend state and a hibernation state.

14. The method of claim 10 wherein the display memory is switched to the power-saving state by stopping a resource to the display memory when the display device is in a predetermined power-saving state and there is no need to send image data to the display device, wherein the resource is selected from a supply of clocks and a supply of power.

15. The method of claim 10 wherein activation of the routine and the image data re-creation are performed by an operating system (OS); the routine is a screen saver; the storage of the activation condition is performed for a registry which is referred to by the OS; and the activation condition is a time condition specifying timing of activation.

16. The method of claim 11 wherein the routine is terminated by generating a pseudo input event for terminating the screen saver routine.

17. The method of claim 10 further comprising:
initializing the data portion of a hardware cursor in the display memory when the screen saver routine is terminated.

18. A product comprising:
a computer usable medium having computer readable program code stored therein, wherein the computer activates a predetermined screen saver routine when a stored and predetermined idle time activation condition is satisfied and executes re-creation of image data on a display memory which holds image data to be displayed by a provided display device when the screen saver routine is terminated, the computer readable program code in said product being effective to:
switch the display memory to a power-saving state that causes the image data to be lost;
rewrite the stored idle time activation condition to an idle time minimum unit so that the screen saver routine is activated;
restore the rewritten idle time activation condition to the original predetermined activation condition after the screen saver routine is activated;
restore the display memory from the power-saving state; and
terminate the activated screen saver routine.

19. The product of claim 18 wherein the screen saver routine is terminated when the display memory is restored from the power-saving state.

20. The product of claim 18 wherein the screen saver routine is terminated in response to operational input after the display memory is restored from the power-saving state.

21. The product of claim 18 wherein the display memory is switched to and restored from the power-saving state in response to the system being switched to and restored from a state wherein the state is selected from a suspend state and a hibernation state.

22. The product of claim 18 wherein the display memory is switched to the power-saving state by stopping a resource to the display memory when the display device is in a predetermined power-saving state and there is no need to send image data to the display device, wherein the resource is a supply of clocks or power.

23. The product of claim 18 wherein activation of the routine and the image data re-creation are performed by an operating system (OS); and the storage of the activation condition is performed for a registry which is referred to by the OS.

24. The product of claim 19 wherein the routine is terminated by generating a pseudo input event for terminating the routine.

25. The product of claim 18 wherein the code is further effective to:
initialize the data portion of a hardware cursor in the display memory when the screen saver routine is terminated.

* * * * *